Figure 1:
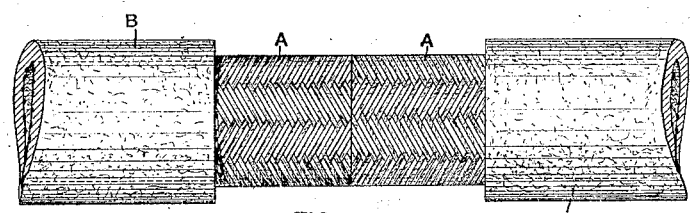

(No Model.)

J. MOSELEY & B. BLUNDSTONE.
INDIA RUBBER TIRE.

No. 475,732.  Patented May 24, 1892.

Witnesses.

Inventors.

UNITED STATES PATENT OFFICE.

JOSEPH MOSELEY AND BENJAMIN BLUNDSTONE, OF MANCHESTER, ENGLAND.

INDIA-RUBBER TIRE.

SPECIFICATION forming part of Letters Patent No. 475,732, dated May 24, 1892.

Application filed December 7, 1891. Serial No. 414,297. (No model.) Patented in England October 23, 1890, No. 16,893.

*To all whom it may concern:*

Be it known that we, JOSEPH MOSELEY and BENJAMIN BLUNDSTONE, citizens of the United Kingdom of Great Britain and Ireland, residing at Manchester, in the county of Lancaster, England, have invented certain new and useful Improvements in India-Rubber Tires, (patented in Great Britain October 23, 1890, No. 16,893,) of which the following is a specification.

This invention relates to india-rubber tires for wheels; and its object is to increase the strength and durability of such tires.

An india-rubber tire constructed according to these improvements consists, in its most elementary form, of a central india-rubber core or tube, a surrounding of yarn or fine wire braided or similarly intersected thereon, and an outer tube or covering of india-rubber. This elementary form of the tire may be modified as to the order and the number of the successive layers upon the central india-rubber tube or core, the essential condition being one or more layers of braided or similarly intersected yarn or fine wire in or around the tire. The yarn or fine wire may most conveniently be laid upon the core, tube, or layer; but it will be obvious that the surrounding or layer of braided or intersected yarn of fine wire may be independently formed upon a seamless tube and be drawn upon the india-rubber core or tube or be used as the basis of the india-rubber tube or tire, but in all cases so that the yarn or wire forms a complete and seamless fabric around the core or center or within the substance of the tire.

The substance of the tires being necessarily made in straight lengths, we may adopt the following means for connecting the ends in making up the individual tires: The outer layer or layers is or are stripped for two or three inches from each end. The ends are then brought together, and the bared portions are served with a spirally-laid serving of tape cemented on, and, if desired, with a second serving. The joint is then rendered flush with a serving of india-rubber compound.

We will more particularly describe our said invention with reference to the accompanying sheet of drawings, in which—

Figure 2:
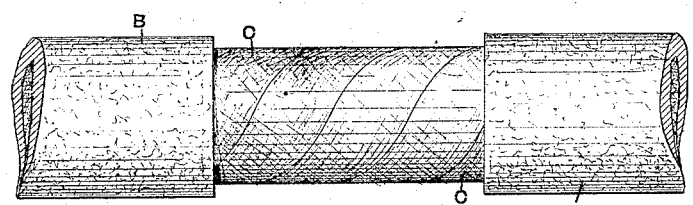
Figure 3:
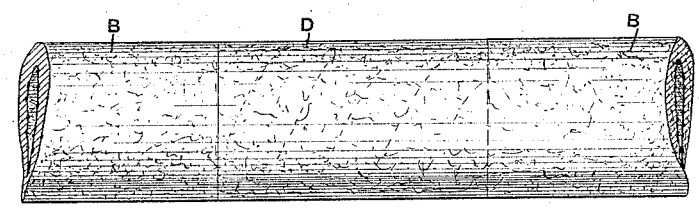

Figure 1 represents a view of two ends of a tire constructed according to these improvements brought together preparatory to making the joint. Fig. 2 is a view of the partly-completed joint, and Fig. 3 is a view of the joint after completion.

In carrying out our invention we prefer, in the first place, to make a length of india-rubber core or tube, braided or similarly protected with the intersected yarn or fine wire A. This long protected core or tube is then cut into shorter lengths, the linear dimensions of which are determined by the circumferences of the wheels upon which the tires are ultimately to be used. Each of these shorter lengths may then be surrounded with a layer of india-rubber and, if desired, with one or more layers of fabric or of india-rubber, or both of fabric and india-rubber; but the outer layer or outer layers B thus served upon the braided core or inner tube A stop short some three or four inches (more or less, according to the dimensions of the tire) from each end, as indicated by Fig. 1. The two ends of the protected inner core or tube are then brought together, so as to form a butt-joint, Fig. 1, and in this position they are served with a surrounding of fabric—such, for example, as a strip of tape or canvas C— to connect the ends and strengthen the joint. This surrounding may be in one or more layers, according to the character and dimension of the tire, and upon it there is or are laid one or more surroundings of india-rubber or of india-rubber and fabric sufficient to bring the part D over the joint to the same or a similar character and dimensions as the rest of the tire, which may then be placed in a mold and be vulcanized in the usual manner.

Although we prefer to make the joint, as hereinbefore described, before vulcanization, this is not absolutely necessary, for the length of tire may be vulcanized before the joint is made, in which case the joint may be separately vulcanized afterward.

These improvements are particularly applicable to inflated or pneumatic tires and to cushioned tires, in which cases the central parts of the tires consist, respectively, of an india-rubber tube or of the cushioning material.

Having now particularly described our said invention, we declare that what we claim is—

1. In an india-rubber tire consisting of two or more layers, a joint constructed by stopping or stripping the outer layer or layers at the ends, serving the contiguous ends with fabric, and surrounding the serving with india-rubber flush with the remainder of the tire, substantially as described.

2. A tire consisting of one or more successive layers of seamless fabric and of india-rubber upon a core or tube of india-rubber, the outer layers being stripped or stopped at the ends, which are joined by a serving of fabric and a surrounding of india-rubber, substantially as described.

3. An india-rubber tire consisting of one or more successive layers of seamless fabric and india-rubber upon a core or tube of india-rubber, the outer layers being stripped or stopped at the ends of the tire, which are joined by successive servings of fabric and india-rubber until the joint is flush with the remainder of the tire, substantially as described.

In testimony that we claim the foregoing as our invention we have signed our names, in presence of two witnesses, this 18th day of November, 1891.

JOSEPH MOSELEY.
BENJAMIN BLUNDSTONE.

Witnesses:
THOMAS A. BRADLEY,
WILLIAM E. WIGS.